(12) United States Patent
Vianson et al.

(10) Patent No.: US 11,019,121 B2
(45) Date of Patent: May 25, 2021

(54) CONTEMPORANEOUS MEDIA SHARING AND DISTRIBUTION

(71) Applicant: Beatdrop LLC, Scottsdale, AZ (US)

(72) Inventors: Bianca Faye Vianson, Scottsdale, AZ (US); Payton Jeanne Stanley, Scottsdale, AZ (US)

(73) Assignee: Beatdrop LLC, Scottsdale, AZ (US)

( * ) Notice: Subject to any disclaimer, the term of this patent is extended or adjusted under 35 U.S.C. 154(b) by 0 days.

(21) Appl. No.: 16/549,336

(22) Filed: Aug. 23, 2019

(65) Prior Publication Data

US 2020/0067999 A1   Feb. 27, 2020

Related U.S. Application Data

(60) Provisional application No. 62/721,907, filed on Aug. 23, 2018.

(51) Int. Cl.
| | | |
|---|---|---|
| *H04L 29/06* | (2006.01) | |
| *G06F 16/635* | (2019.01) | |
| *G06F 16/638* | (2019.01) | |

(52) U.S. Cl.
CPC ........ *H04L 65/4076* (2013.01); *G06F 16/635* (2019.01); *G06F 16/639* (2019.01); *H04L 65/4084* (2013.01)

(58) Field of Classification Search
CPC combination set(s) only.
See application file for complete search history.

(56) References Cited

U.S. PATENT DOCUMENTS

| 2008/0091771 A1 | 4/2008 | Allen |
| 2016/0098746 A1 | 4/2016 | Lewis et al. |

(Continued)

FOREIGN PATENT DOCUMENTS

| KR | 10-2014-0117238 A | 10/2014 |
| KR | 10-2015-0090306 A | 8/2015 |
| WO | 2010-084329 A2 | 7/2010 |

OTHER PUBLICATIONS

PCT International Search Report and Written Opinion in International Application PCT/US2019/047942, dated Feb. 13, 2020, 11 pages.

(Continued)

*Primary Examiner* — El Hadji M Sall
(74) *Attorney, Agent, or Firm* — Merchant & Gould P.C.

(57) ABSTRACT

Aspects include systems and methods to contemporaneously share and distribute media or content. Media sharing may have a plurality of configurations, comprising a plurality of computing devices, a media-sharing server, and a media server connected over a network. In an embodiment, a DJ may broadcast media or content received from a media server over a media-sharing server for a Listener to listen contemporaneously. A DJ may be made available to a Listener in a variety of ways, including permissions to connect to a specific user, proximity, or popularity. In an additional embodiment, contemporaneous may not necessarily mean simultaneous, but may instead be defined by listening to media or content in the same order and within a certain time period of the DJ. In a further example, the media-sharing server may act as a broker for a Listener to purchase or replay media or content from a third-party media seller.

20 Claims, 12 Drawing Sheets

(56) References Cited

U.S. PATENT DOCUMENTS

2016/0357498 A1\* 12/2016 Krasadakis ........... G07F 17/323
2017/0178257 A1\* 6/2017 Tingler ............ G06K 19/07758
2020/0059556 A1\* 2/2020 Klimczak .............. H03G 9/005

OTHER PUBLICATIONS

PCT International Preliminary Report on Patentability in Application PCT/US2019/047942, dated Mar. 4, 2021, 8 pages.

\* cited by examiner

CONTEMPORANEOUS MEDIA SHARING AND DISTRIBUTION

CROSS-REFERENCE TO RELATED APPLICATIONS

This application claims priority to and the benefit of U.S. Provisional Patent Application No. 62/721,907 filed on Aug. 23, 2018, the disclosure of which is hereby incorporated by reference herein in its entirety.

TECHNICAL FIELD

The present disclosure relates to contemporaneous media sharing and distribution methods and systems.

BACKGROUND

Various media sharing methods, applications, and services involve generic, non-personalized media file sharing that is not contemporaneous, ordered, and easily purchasable. Media-sharing technology currently available on the market provide either (1) sharing of generalized lists of music or media, (2) single file media sharing, or (3) live streaming sharing. However, none of the present technology provides an ideal media-sharing experience:

(1) Although sharing of generalized lists of media allows sharing of a genre that may be personalized to an individual, this technology does not provide sharing of identical media files in the same order. Additionally, these generalized lists are often compiled using preferences from multiple individuals, rather than being specific to one person. Even if the list of media files were all selected by one individual, sharing of the lists would result in multiple listeners experiencing different media files in different orders.

(2) While single file media sharing will allow sharing of the same media file, the current method of sharing the single media file is cumbersome for the individual sharing the media file, and is disruptive of the sharing individual's media experience. For example, an individual wanting to share a media file with a friend would need to identify the file, find a way to share the file, identify the friend, and only then be able to send information about the file to the friend. Moreover, even after running through the cumbersome process of sharing the individual file, this process would have to be repeated for every media file that an individual wishes to share.

(3) Live-streaming media files, on its face, seems to remedy the aforementioned problems—generally broadcasting each media file in a way that will allow others to follow along with the media in the same order. However, live streaming fails to provide listeners with an insightful listening experience because there is not an easily-searchable list of live-streaming stations for an individual to share a personalized list of ordered media files. Additionally, live streaming does not allow listeners to listen to broadcasted media files from the beginning of the file, and instead only allows listeners to track directly with the broadcaster. There is also no capability for listeners to directly reroute from the broadcaster to acquire purchase information about the media file, and instead requires listeners to search for the media file separately. Furthermore, media stations that are live-streamed through various applications do not provide a listening experience of one individual, but instead operate to play music requested by a large number of listeners.

It is with respect to these and other general considerations that the aspects disclosed herein have been made. Although relatively specific problems may be discussed, it should be understood that the examples should not be limited to solving the specific problems identified in this section or elsewhere in this disclosure.

BRIEF SUMMARY

The subject matter of the present disclosure is directed to providing contemporaneous media sharing and distribution environment to optimize media sharing among multiple individuals. Specifically, the present disclosure teaches methods and systems for contemporaneously sharing or distributing media or content.

Among other things, aspects of the present disclosure include systems and methods to contemporaneously share and distribute media or content. Media sharing systems may have a plurality of configurations, comprising a plurality of computing devices, a media-sharing server, and a media server connected over a network. In an embodiment, a disc jockey (DJ) mode (i.e., a mode of operation of a computing device) may operate to broadcast media or content received from a media server over a media-sharing server for a Listener mode (i.e., another mode of operation of a computing device) to listen contemporaneously. A DJ may be made available to a Listener in a variety of ways, including access permissions to connect to a specific user, proximity, or popularity. In an additional embodiment, "contemporaneous" may not necessarily mean simultaneous, but may instead be defined by listening to media or content in the same order and within a certain time period of the DJ. In a further example, the media-sharing server may act as a broker for a Listener to purchase or replay media or content, or may instead redirect the Listener to a third-party source.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

The accompanying figures illustrate one or more embodiments of the disclosed contemporaneous media sharing and distribution methods and systems and, together with the detailed description, serve to explain the aspects and implementations of contemporaneous media sharing and distribution. In the appended figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label. Non-limiting and non-exhaustive examples are described with reference to the following figures.

Figure 1:
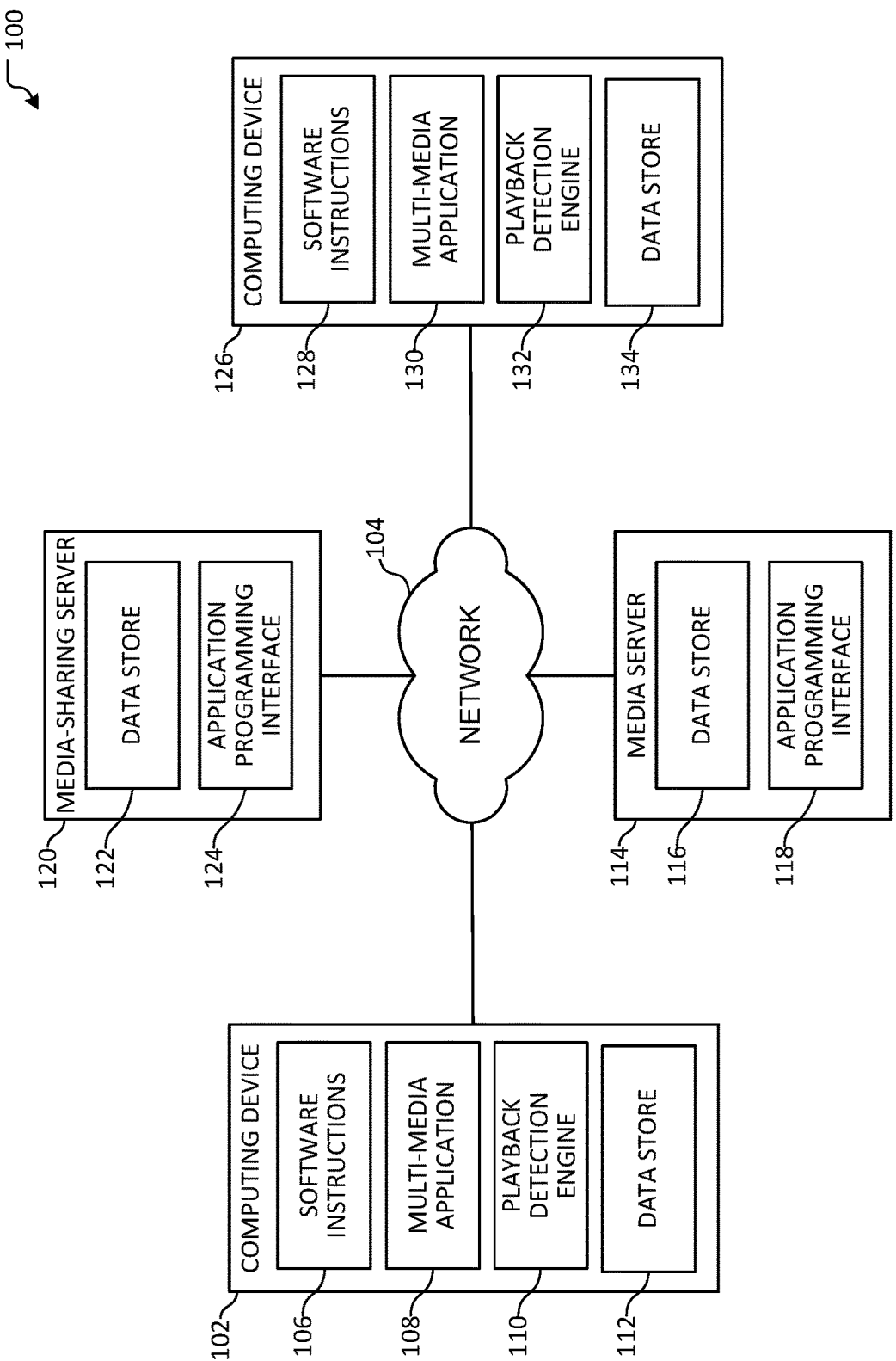
FIG. 1 shows an overview of an example system for contemporaneous media sharing and distribution.

While embodiments of the disclosure are amenable to various modifications and alternative forms, specific embodiments have been shown by way of example in the drawings and are described in detail below. The intention is not to limit the scope of the disclosure to the particular embodiments described. On the contrary, the disclosure is intended to cover all modifications, equivalents, and alternatives falling within the scope of the disclosure and the appended claims.

DETAILED DESCRIPTION

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entire software implementation, or an implementation combining software and hardware aspects. The following detailed description is, therefore, not to be interpreted in a limiting sense.

Accordingly, the present disclosure provides systems and methods for contemporaneous media sharing and distribution. In an example, the present disclosure aims to enable easy and fast sharing of media or content files contemporaneously among two or more devices. This solution enables individuals to feel emotionally connected through shared media, may allow diversification of new media through personalized content that is not genericized, may allow individuals to satisfy curiosity of what type of media or content a user is playing in the moment, or may enable a platform for aspiring DJs to promote themselves.

As an example, a computing device may be any of a variety of devices, including, but not limited to, a mobile computing device, a tablet computing device, a desktop or laptop computing device, an Internet of Things (IoT) computing device, a server computing device, or a distributed computing device (e.g., which may be comprised of a plurality of computing devices). An API provided by or made available by the computing device may enable a set of software instructions to engage in file system access or searching, network communication, process management, memory management, or communication with a specific hardware component (e.g., device drivers, sensor data access, etc.), among other functionality. While the term API is used, it will be appreciated than an API may comprise any of a wide variety of software interfaces, commands, libraries, or services, among others, useable by a set of software instructions when executed by a computing device.

As used herein, "software," "software instructions," and a "set of software instructions" may be used interchangeably. Example software may include applications, plugins, scripts, modules, drivers, and/or web applications, among other examples. In some examples, software may be pre-compiled, compiled at runtime, or interpreted at runtime. In another example, software may execute in kernel mode, user mode, or a combination thereof.

As used herein, "media" for contemporaneous media sharing and distribution may include, but is not limited to, music, television, movies, podcasts, or any other visual and/or audial media file. No restriction is intended by use of the terms regardless of how the media may be exemplified. Additionally, as used herein, "DJ" and "broadcaster" may be used interchangeably to represent a mode of operation of a computing device operating to share media via contemporaneous media sharing and distribution. The media being shared by the DJ or broadcaster may be any of the aforementioned examples of media or content, and is not limited to one form of media or content. Likewise, "Listener," as used herein, represents a mode of operation of a computing device operating to receive contemporaneous media sharing and distribution from a DJ. Furthermore, as used herein, "media or content information" and "playback information" may be used interchangeably. Media or content information may include a variety of identifying information for media or content, including title, origin, identifier in the data store of the first computing device, or any other media or content identifying information for use in retrieval of associated media or content from a media server, or may alternatively mean information used directly to play media or content directly from the media-sharing server.

With these broad concepts in mind, several examples of contemporaneous media sharing and distribution are discussed below.

For example, FIG. 1 shows an overview of an example system 100 for contemporaneous media sharing and distribution. As shown, system 100 comprises a first computing device 102, network 104, media server 114, media-sharing server 120, second computing device 126, and second media server 136. In an example, computing devices 102, 126 may communicate with media servers 114, 136 and media-sharing server 120 by way of network 104. As an example, computing devices 102, 126, media server 114, and media-sharing server 120 may communicate using wired and/or wireless connections to network 104. While system 100 is depicted with two computing devices 102, 126, one network 104, two media servers 114, 136 and one media-sharing server 120, system 100 may also be appreciated in other examples comprising alternate quantities of such elements.

Computing device 102 may be any of a variety of devices, not necessarily being the same variety of device as computing device 126, including, but not limited to, a mobile computing device, tablet computing device, desktop or laptop computing device, IoT computing device, server computing device, or distributed computing device. Computing device 102 is shown as comprising software instructions 106, multi-media application 108, playback detection engine 110, and data store 112. In some examples, computing device 102 may form at least a part of an execution environment in which an operating system (OS) and/or other software may execute.

For example, software instructions 106 may execute on computing device 102. Software instructions 106 may be an application, plugin, script, module, driver, and/or web application, among other examples. In some examples, software instructions 106 may be pre-compiled, compiled at runtime, or interpreted at runtime. In another example, software instructions 106 may execute in kernel mode, user mode, or a combination thereof.

Software instructions 106 may call one or more multi-media applications that are available in the execution environment of computing device 102. For example, software instructions 106 may call multi-media application 108. In some examples, multi-media application 108 may enable software instructions 106 to engage in file system access or searching, network communication, process management, memory management, or communication with a specific hardware component (e.g., device drivers, sensor data access, etc.), among other functionality. In examples, multi-media application 108 may be provided by an OS of computing device 102. While examples are discussed herein with respect to multi-media application 108, multi-media application 108 is additionally appreciated to comprise any of a variety of software interfaces, commands, libraries, or services, among others, useable by software instructions 106 when executed by computing device 102. In examples, at least some multi-media applications that comprise a playback detection engine and data store that may enable contemporaneous sharing and distribution of media.

As shown, computing device 102 further comprises playback detection engine 110. In an example, playback detection engine 110 may perform aspects disclosed herein in order to provide contemporaneous media sharing and distribution. In some examples, playback detection engine 110 may identify when computing device 102 is loading or playing media or content on computing device 102. This identification of media or content loading or playing by playback detection engine 110 may originate from a data store of computing device 102, or may be received over a network (e.g., network 104) from a media server (e.g., media servers 114, 136) or a media-sharing server (e.g., media-sharing server 120), or any other media or content origin that may be received by computing device 102. In an example, playback detection engine 110 may identify the loading or playing of media or content via a variety of measurements, including manual indication by the user, audial feedback, display feedback, content type being accessed in a data store, frequency and quantity of data being downloaded, or other metric that may be used to indicate computing device 102 is currently downloading or outputting media or content. As an example, playback detection engine 110 may detect either when computing device 102 may operate in DJ mode, or when computing device 102 may operate in Listener mode.

Data store 112 of computing device 102 may comprise media or content information, or playback information, which may be used by playback detection engine 110 when identifying when computing device 102 is downloading or playing media or content, as according to aspects disclosed herein. As an example, data store 112 may store media or content files, or fragments of media or content files, being downloaded or played on computing device 102. Media or content information, or playback information, being stored in data store 112 may comprise a name, description, media type, storage time, and/or information relating to how computing device 102 may use the media or content information, or may be executed by software instructions 106.

Computing device 126 comprises elements similar to computing device 102, and may be configured in a same or similar way. As an example, computing device 126 is shown as comprising software instructions 128, multi-media application 130, playback detection engine 132, and data store 134.

System 100 also comprises media server 114. In an example, media server 114 may be a server for accessing, temporarily or permanently, media or content. Media server 114, as shown, comprises data store 116 and application programming interface (API) 118. In some examples, data store 116 may comprise media or content information, or playback information, which may be shared via API 118 of media server 114 with computing device 102 or computing device 126 over network 104. Media or content information being stored in data store 116 may comprise a name, description, media type, storage time, and/or information relating to media server 114. In some examples, API 118 may enable computing device 102 to access data store 116 to engage in file system access or searching, network communication, process management, memory management, or communication with a specific hardware component (e.g., device drivers, sensor data access, etc.), among other functionality. In examples, API 118 may be provided by an OS of media server 114. While examples are discussed herein with respect to API 118, it will be appreciated that, in other examples, API 118 may comprise any of a wide variety of software interfaces, commands, libraries, or services, among others, useable by media server 114. In examples, at least some of APIs on which media or content is stored or shared enable temporary or permanent downloading, streaming, purchasing, or other media or content sharing or distribution.

Media server 136 comprises elements similar to media server 114, and may be configured in a same or similar way. As an example, media server 136 is shown as comprising data store 138 and application programming interface (API) 140.

System 100 further comprises media-sharing server 120. In an example, media-sharing servers 114, 136 may be servers for temporarily sharing and distributing media or content between various computing devices (e.g., between computing device 102 and computing device 126). Media-sharing server 120, as shown, comprises API data store 122 and API 124. In some examples, data store 122 may comprise media or content information, or playback information, received from a computing device over network 104, which may be shared via API 124 of media-sharing server 120 with a different computing device over network 104. Media or content information being stored in data store 122 may comprise a name, description, media type, storage time, and/or information relating to media-sharing server 120. In some examples, API 124 may enable media-sharing server 120 to access data store 122 to engage in file system access or searching, network communication, process management, memory management, or communication with a specific hardware component (e.g., device drivers, sensor data access, etc.), among other functionality. In examples, API 124 may be provided by an OS of media-sharing server 120. While examples are discussed herein with respect to API 124, it will be appreciated that, in other examples, API 124 may comprise any of a wide variety of software interfaces, commands, libraries, or services, among others, useable by media-sharing server 120. In examples, at least some of APIs on which media or content is stored or shared enable temporary downloading of full media or content files, temporary downloading of fragments of media or content files, streaming from data store 122, purchasing through media-sharing server 120 or being redirected to purchase through media servers 114, 136 over network 104, or other media or content sharing or distribution between at least two computing devices.

In one embodiment, computing device 102 may operate in a DJ mode and computing device 126 may operate in a Listener mode. As an example, computing device 102 may be connected to media server 114 over network 104, interacting with application programming interface 118 to retrieve media or content information, or playback information, from data store 116 of media server 114 to store in data store 112 of computing device 102 for playing. Playback detection engine 110 may identify that computing device 102 is downloading or playing media or content from media server 114 over network 104. Playback detection engine 102 may then cause software instructions 106 to retrieve media or content information, which may include media or content identifying information for later retrieval of the media or content from media server 114 or retrieval from a different media server (such as media server 136), from data store 112. The media or content information may then be sent to multi-media application 108 to be shared with media-sharing server 120 over network 104 through application programming interface 124 of media-sharing server 120 to be temporarily stored in data store 122 of media-sharing server 120. After computing device 126 connects to media-sharing server 120 over network 104, multi-media application 130 of computing device 126 may retrieve the media or content in data store 122 of media-sharing server 120 through application programming interface 124, by executing software instructions 128. Media or content information may then be temporarily stored in data store 134 of computing device 126. If the media or content information is identifying information, such as title, artist, or origin, then computing device 126 may connect to one or more media servers (such as media servers 114, 136) over network 104 to search for the media or content associated with the media or content information on the media servers. If the media or content information is information used to play media or content, then the media or content information may be played by computing device 126 when executing software instructions 128. Computing device 102 (operating in DJ mode) and computing device 126 (operating in Listener mode) may be connected to the same media server (such as media server 114 or media server 136) over network 104, may be connected to different media servers (e.g., computing device 102 connected to media server 114 and computing device 126 connected to media server 136) over network 104, or may not be connected to a media server. If media or content information is identifying information that may be used to retrieve media or content from a media server, then the media or content information may be used to identify identical media or content across multiple media servers (such as media servers 114, 136).

As an example, if computing device 102 (operating in DJ mode) and computing device 126 (operating in Listener mode) are both connected to the same media server 114, then the media or content information sent to computing device 126 from the media-sharing server 120 may be used to retrieve media or content identical to the media or content playing on computing device 102 from media server 114 as software instructions are executed on computing device 126.

As another example, if computing device 102 is connected to media server 114 and computing device 126 is connected to media server 136, the media or content information sent to computing device 126 from the media-sharing server 120 may be used to retrieve media or content from media server 136 that is identical to the media or content playing on computing device 102 from media server 114, as software instructions are executed on computing device 126.

As an additional example, if computing device 102 is connected to media server 114 and computing device 126 is connected to both media servers 114, 136, the media or content information sent to computing device 126 from the media-sharing server 120 may be used to retrieve media or content from either media server 114, or media server 136, that is identical to the media or content playing on computing device 102 from media server 114, as software instructions are executed on computing device 126. In this example, one or more media servers may be prioritized to retrieve media or content (e.g., the software instructions executed on computing device 126 may prioritize searching media server 114 for media or content associated with the media or content information from the media-sharing server 120 if the media or content information indicates media originated from media server 114 on computing device 102).

As a further example, if computing device 102 is connected to media server 114 and computing device 126 is not connected to a media server, when software instructions execute on computing device 126 to search for media or content associated with the media or content information retrieved from the media-sharing server 120, computing device 126 may be prompted to connect to media servers (such as media servers 114, 136) and may present an option for a user of computing device 126 to allow computing device 126 to connect to a media server (such as media server 114, 136) to enable searching for media or content associated with the media or content information.

In another example, computing device 102 may not be connected to a media server but may still send content or media information to the media-sharing server 120 to be retrieved by computing device 126 to search for media or content associated with the media or content information.

Playback detection engine 132 may identify when media or content ends on computing device 126 and may then cause software instructions 128 to prompt multi-media application 130 to retrieve additional media or content information, or playback information, from media-sharing server 120 over network 104. While example techniques of media or content sharing and distribution are described herein, it will be appreciated that other techniques may be used without departing from the spirit of this disclosure.

Figure 2:
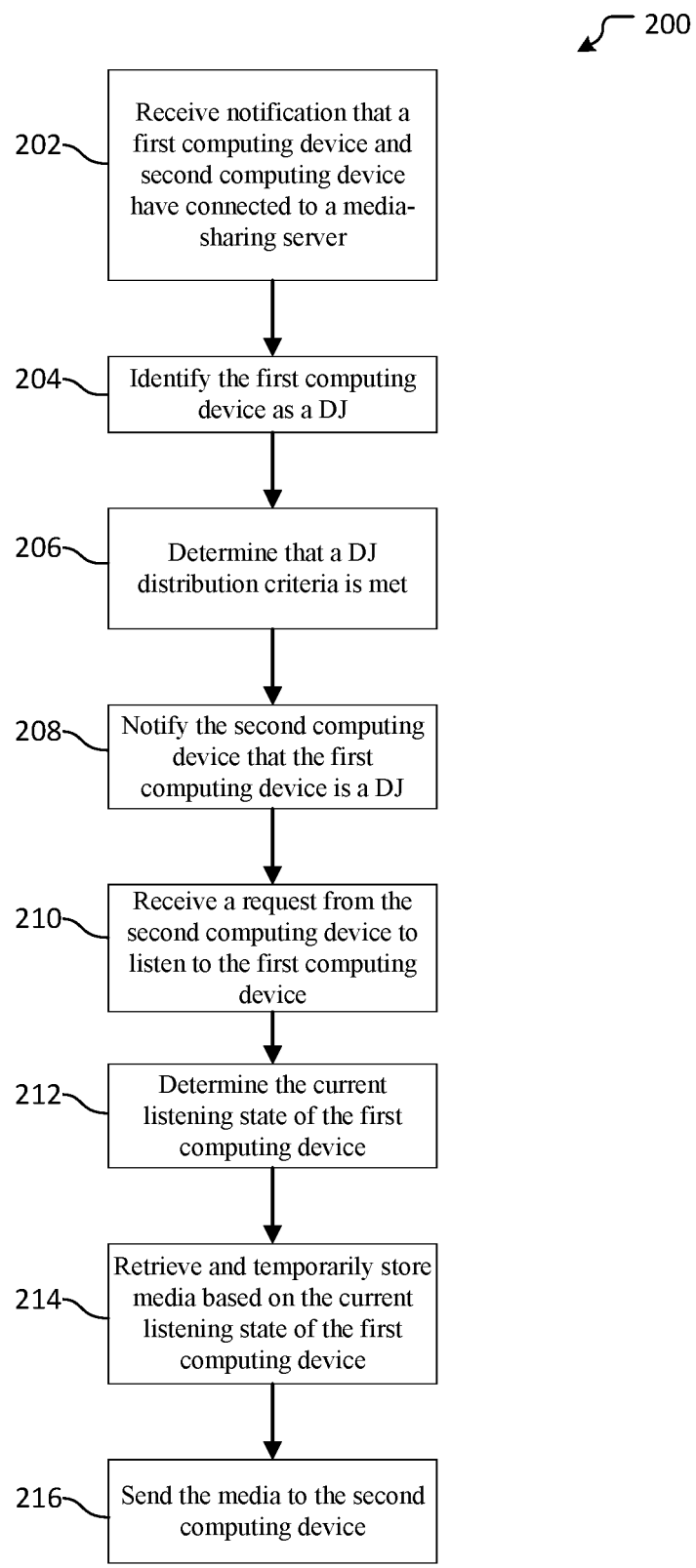
FIG. 2 shows an overview of an example method for sharing media contemporaneously, from the media-sharing server perspective.

FIG. 2 shows an overview of an example method for sharing media contemporaneously, from the media-sharing server perspective. In an example, method 200 may be performed by a media-sharing server, such as media-sharing server 120. Method 200 begins at operation 202, where the media-sharing server receives a notification that a first computing device and a second computing device have connected to the media-sharing server. As an example, the first and second computing devices may connect to the media-sharing server over a network, such as network 104, and connect to the media-sharing server via an API on the server, such as API 124, and a multi-media application on the computing device, such as multi-media application 108, 130.

Flow progresses to operation 204, where the media-sharing server identifies the first computing device as operating in a DJ mode. As an example, identification of DJ status may be manually indicated by an option on the first computing device, such as a user of the first computing device selecting a DJ status. Additionally or alternatively, identification may be automatically determined by a state of a playback detection engine, such as playback detection engine 110, thereby automatically identifying the first computing device as operating in a DJ mode if the playback detection engine identifies that the first computing device is loading or playing media or content. As a further example, identification of the first computing device as operating in a DJ mode may be determined by pre-established device settings or settings in the API of the media-sharing server. Other DJ identification methods should be appreciated.

At operation 206, the media-sharing server determines that a DJ distribution criteria is met. As an example, a DJ distribution criteria may be met in a variety of ways. An example of one way the criteria may be met is if the first computing device and second computing device have access permissions to view an authorized group. For example, if the first and second devices are "friends" or are members of the same exclusive group, such as being part of any university, for example to share media or content across the same university campus or across the nation via sharing across different university campuses. As an example, members of university groups may be verified with a .edu domain for an email address of a computing device. As another example, a DJ distribution criteria may be met if the first and second computing devices are within a predefined radius or proximity of each other. This example may be further limited by requiring the DJ to allow broadcasting within the predefined radius, with a further option of broadcasting anonymously. As a further example, the criteria may be met automatically if the DJ has exceeded a moving popularity threshold. For example, the top predefined number of DJs broadcasting on the media-sharing server or DJs identified as celebrity accounts on the media-sharing server may automatically meet this criteria.

Only after a DJ distribution criteria is met may method 200 progress to operation 208, where the media-sharing server notifies or makes available to the second computing device that the first computing device is operating in a DJ mode. For example, the second computing device that is connected to the media-sharing server may only be able to see that the first computing device is broadcasting as a DJ after a DJ distribution criteria is met. As an example, an API of the media-sharing server, such as API 124, may only show a DJ available for selection by the second computing device to listen to or follow after a DJ distribution criteria is met.

Method 200 then progresses to operation 210 where the media-sharing server receives a request from the second computing device (operating in a Listener mode) to listen to the first computing device (operating in a DJ mode). As an example, this request may be made by the second computing device selecting the DJ through the API of the media-sharing server. The DJ selection available to the second computing device may be divided into categories. As an example, DJ categories may be divided by how the DJ distribution criteria was met, by genre, by popularity, or any other way of categorizing available DJs. After the request to listen to a DJ is received, the DJ may have the option to accept a Listener (responding YES to indicate the requesting Listener may listen to the DJ) or decline the Listener (responding NO to indicate the requesting Listener may not listen to the DJ). If the DJ responds NO, then the Listener may then be returned to operation 208 to select an available DJ, where the DJ that just responded NO may or may not appear on the list of available DJs.

After a request to listen to a DJ is received and the DJ responds YES allowing the listener to listen, method 200 continues to operation 212 where the media-sharing server determines the current listening state of the first computing device (operating in a DJ mode). As an example, the media-sharing server may determine media or content information, or playback information, being downloaded or played on the first computing device (operating as the DJ) to be used to identify the media or content to be shared with the second computing device (operating as the Listener). For example, the media or content information determined may be a variety of identifying information for the media or content, including title, origin, identifier in the data store of the first computing device, or any other media or content identifying information for later use in retrieval. As a further example, operation 212 may determine that the first computing device (DJ) is still broadcasting media or content at the time the media-sharing server receives a request to listen. For example, operation 212 may require rechecking DJ status of the first computing device at this step if the second computing device (operating in a Listener mode) was attempting to reconnect to a DJ. This reconnection may occur if the Listener disconnects from the media-sharing server or if the Listener has settings within the media-sharing server to reconnect to the last-listened DJ without re-proceeding through all of the selection steps of method 200.

Method 200 then progresses to operation 214 where the media-sharing server retrieves and temporarily stores media or content based on the current listening state of the first computing device, determined at operation 212. As an example, the media-sharing server may connect to the first computing device (operating in a DJ mode) through the device's multi-media application to execute software instructions of the first computing device to access a data store of the first computing device for retrieval of stored media or content information, or playback information, being identified by a playback detection engine of the first computing device. Software instructions of the first computing device may then execute to deliver the media or content information to the media-sharing server over a network, to be temporarily stored in a data store of the media-sharing server for later distribution to a second computing device (operating in a Listener mode).

After the media-sharing server retrieves and temporarily stores media or content information based on the current listening state of the first computing device, method 200 progresses to and terminates at operation 216 where the media-sharing server sends the media or content information temporarily stored to the second computing device for searching for associated media or content (if media or content information is identifying information that may be used to search for associated media or content on a media server) or listening (if the media or content information may be used for media or content playback from the media-sharing server). As an example, media or content information, or playback information, temporarily stored in the data store of the media-sharing server may be sent to a second computing device over a network causing a multi-media application of the second computing device to execute software instructions to store the media or content information in a data store of the second computing device to be used to search a media server for associated media or content or to be played on the second computing device, as detected by a playback detection engine of the second computing device.

Figure 3:
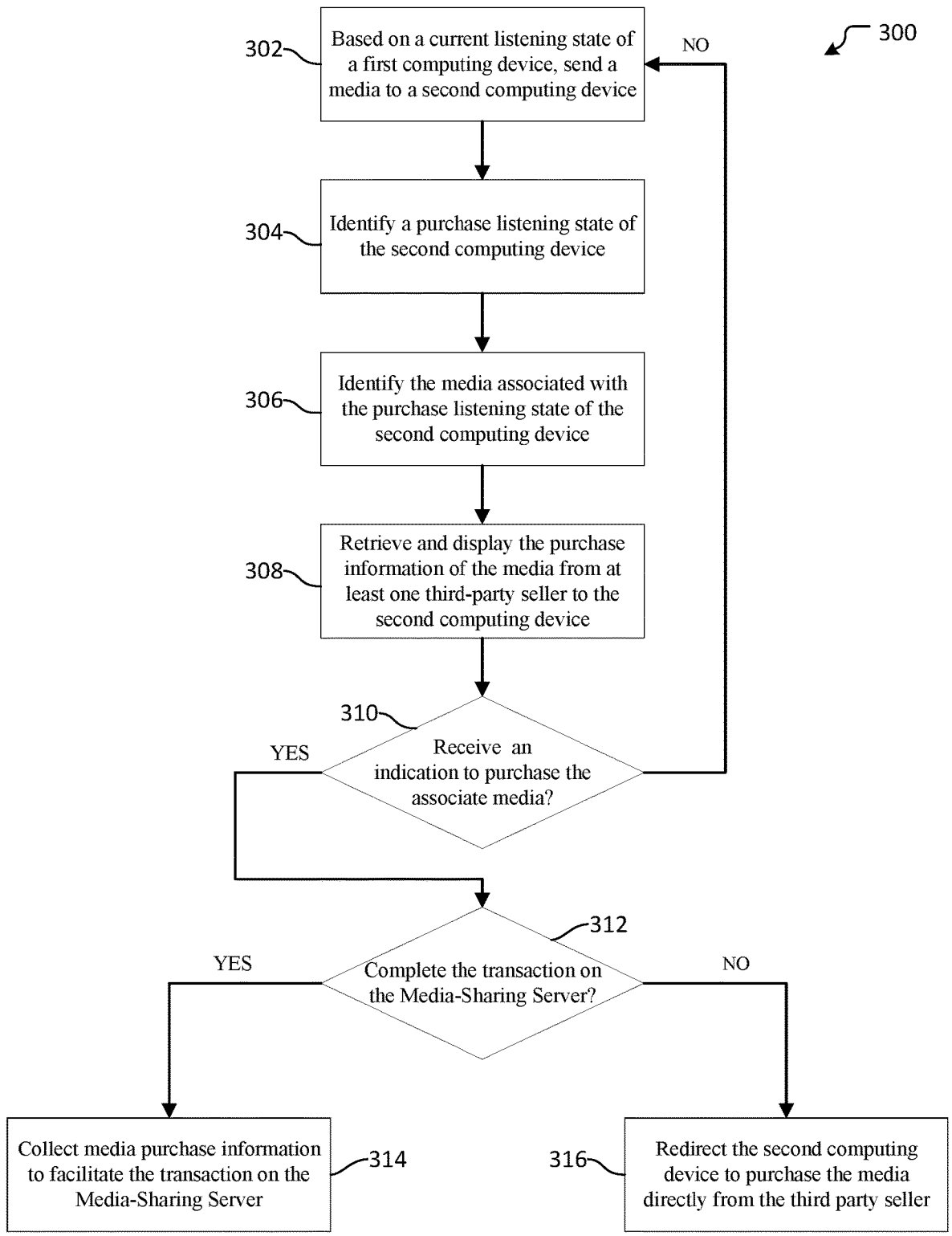
FIG. 3 shows an overview of an example method for distributing purchase information during contemporaneous media sharing and distribution, from the media-sharing server perspective.

FIG. 3 shows an overview of an example method 300 for distributing purchase information during contemporaneous media sharing and distribution, from the media-sharing server perspective. In an example, method 300 may be performed by a media-sharing server, such as media-sharing server 120. In some examples, aspects of method 300 may be performed at operation 216, as discussed above with respect to FIG. 2. Method 300 begins at operation 302, where, based on a current listening state of a first computing device (operating in a DJ mode), the media-sharing server sends media or content information to a second computing device. As an example, media or content information, or playback information, temporarily stored in the data store of the media-sharing server may be sent to a second computing device over a network causing a multi-media application of the second computing device to execute software instructions to store the media or content information in a data store of the second computing device to be used to search a media server for associated media or content, or to be played on the second computing device, as detected by a playback detection engine of the second computing device.

Method 300 then proceeds to operation 304, where the media-sharing server identifies a purchase listening state of the second computing device. A purchase listening state of the second computing device may be determined from interaction directly with the media-sharing server or with a media server connected by the second computing device. As an example, a purchase listening state may be triggered by the second computing device finishing the sent media or content, sending a request to "like" the current listening state media or content, sending a request to receive purchase information about the media or content, skipping or terminating media or content, or any other progression, indication of status, or interaction with the current listening state media or content on the media-sharing server or media server. While the media or content of the current listening state may remain playing in some of the aforementioned triggers, it should be appreciated that the media or content of the current listening state may remain the same or be updated depending on the trigger.

At operation 306, the media-sharing server identifies the media or content associated with the purchase listening state of the second computing device. For example, the media or content information, or playback information, associated with the purchase listening state of the second computing device may have a variety of identifying information, including title, origin, identifier in the data store of the first computing device, or any other media or content identifying information, for later use in retrieval of purchase information associated with the media or content. This identifying information may be identified from the data store of the second computing device, may be identified from identifying information temporarily stored in the data store of the media-sharing server, or may be identified from media or content being played on a media server.

Method 300 then proceeds to operation 308 where the media-sharing server retrieves and displays the purchase information of the media or content from at least one third-party seller to the second computing device, where the third-party seller may be a media server. As an example, media or content purchase information may be retrieved from third-party sellers using identifying information identified at operation 306, which may then be used when connecting the media-sharing server to a media server that enables purchasing of the media or content over a network. Once the media-sharing server has determined that the media server sells the media or content, the media-sharing server may display an indication of available purchase information to the second computing device, not necessarily displaying details associated with the purchase information.

Continuing to determination 310, the media-sharing server determines if it receives an indication from the second computing device to purchase the associate media or content displayed at operation 308. If, at determination 310, the media-sharing server determines that there is no indication from the second computing device to purchase the associated media, flow branches NO to operation 302 where the second computing device continues to listen to media or content based on a current listening state of a first computing device until a purchase listening state of the second computing device is identified. If, however, the media-sharing server determines at determination 310 that an indication to purchase the associated media is received, flow instead branches YES to determination 312, where the purchase transaction may begin.

For example, at determination 312, the media-sharing server determines if the purchase transaction will be completed on the media-sharing server. If, at determination 312, the media-sharing server determines that the purchase transaction will not be completed on the media-sharing server, flow branches NO to operation 316 where the media-sharing server may redirect the second computing device to purchase the media or content directly from a media server third-party seller. If, however, the media-sharing server determines that the purchase transaction will be completed on the media-sharing server, flow instead branches YES to operation 314 where the media-sharing server collects media purchase information to facilitate the transaction on the media-sharing server. For example, the media-sharing server may use the identified purchase information for the media or content to connect to a media server over a network, collecting the purchase information from the media server to then facilitate the transaction on the media-sharing server.

Figure 4:
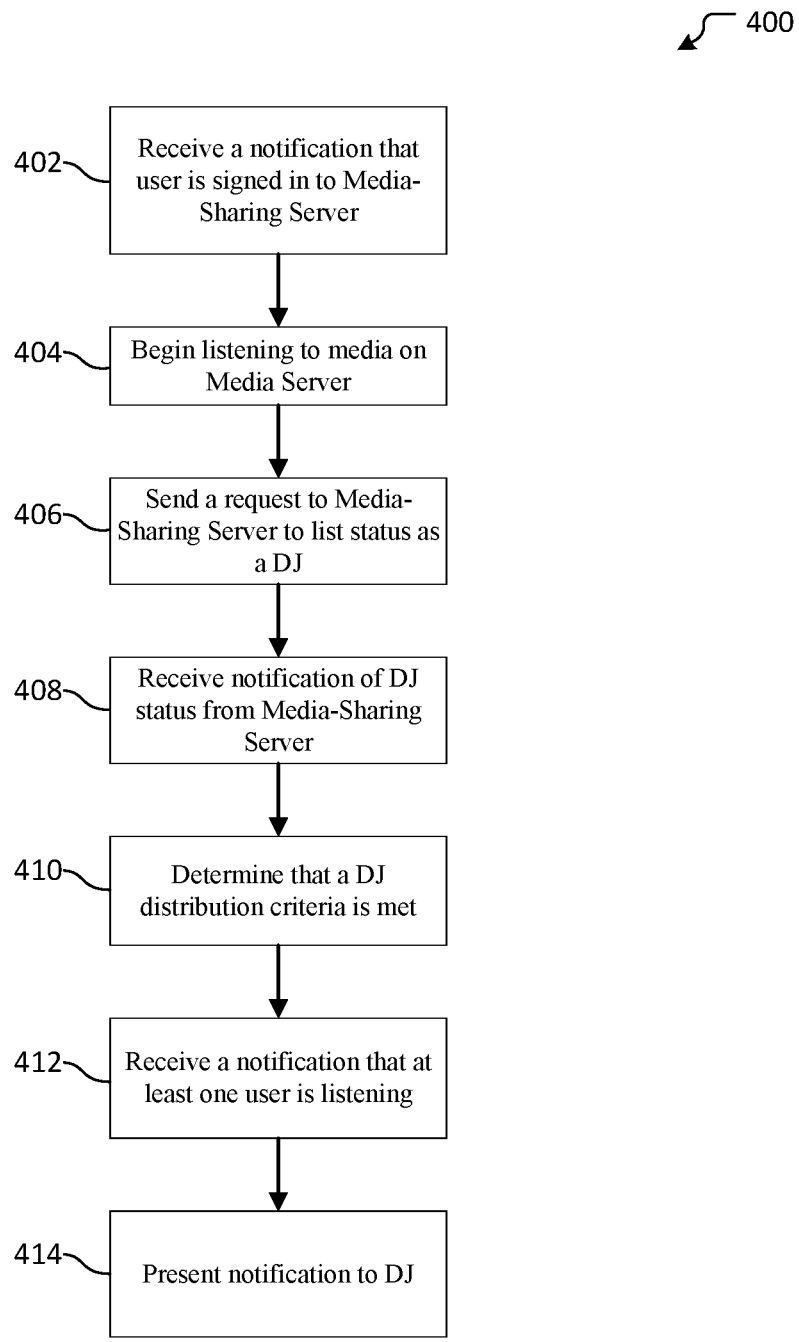
FIG. 4 shows an overview of an example method for broadcasting media for contemporaneous listening, from the client perspective.

FIG. 4 shows an overview of an example method for broadcasting media for contemporaneous listening, from the client perspective. In an example, method 400 may be performed by a computing device, such as computing device 102, 126. In some examples, aspects of method 400 may be performed at operation 202, as discussed above with respect to FIG. 2. Method 400 begins at operation 402, where a user of a computing device receives a notification that the user is signed in or logged in to an account of a media-sharing server, such as media-sharing server 120. As an example, the user may use a computing device to connect to the media-sharing server over a network, such as network 104, and connect to the media-sharing server via an API on the server, such as API 124, and a multi-media application on the computing device, such as multi-media application 108, 130.

Flow progresses to operation 404 where the user beings downloading or playing media or content on a media server, such as media server 114, using the computing device. As an example, the computing device may connect to the media server over a network, utilizing an API of the media server and a multi-media application of the computing device. As an example, the computing device may be connected to the media server over a network, interacting with an API of the media server to retrieve media or content information, or playback information, from a data store of the media server to store the media or content in the data store of the computing device for playing.

At operation 406, the computing device sends a request to the media-sharing server to list the user's status as a DJ. As an example, identification of DJ status may be manually indicated or switched by an option on the user interface of the computing device. Additionally or alternatively, identification may be automatically determined by a state of a playback detection engine, such as playback detection engine 110, thereby automatically identifying the computing device as operating in a DJ mode if the playback detection engine identifies that the first computing device is loading or playing media or content. As a further example, identification of the first computing device as a DJ may be determined by pre-established device settings or settings in the API of the media-sharing server. Method 400 then progresses to operation 408, where the computing device receives a notification of granted DJ status from the media-sharing server.

After receiving DJ status, method 400 progresses to operation 410 where there is a determination that a DJ distribution criteria is met. This determination may be performed by the media-sharing server, the computing device, or a combination thereof. As an example, a DJ distribution criteria may be met in a variety of ways. An example of one way the criteria may be met is if the first computing device and second computing device have access permissions to view an authorized group. For example, if the first and second devices are "friends" or are members of the same exclusive group, such as being part of any university, for example to share media or content across the same university campus or across the nation via sharing across different university campuses. As an example, members of university groups may be verified with a .edu domain for an email address of a computing device. As another example, a DJ distribution criteria may be met if the first and second computing devices are within a predefined radius or proximity of each other. This example may be further limited by requiring the DJ to allow broadcasting within the predefined radius, with a further option of broadcasting anonymously. As a further example, the criteria may be met automatically if the DJ has exceeded a moving popularity threshold. For example, the top predefined number of DJs broadcasting on the media-sharing server or DJs identified as celebrity accounts on the media-sharing server may automatically meet this criteria.

Method 400 then continues to operation 412 where the computing device receives a notification that at least one user is listening, followed by operation 414 where the notification is presented to the user that at least one user is listening. For example, a Listener connected to the media-sharing server may only be able to see that the first computing device is broadcasting as a DJ after a DJ distribution criteria is met. As an example, an API of the media-sharing server, such as API 124, may only show a DJ available for selection by a Listener after a DJ distribution criteria is met. As a further example, DJ availability and selection may be divided into categories. As an example, DJ categories may be divided by how the DJ distribution criteria was met, by genre, by popularity, or any other way of categorizing available DJs. As an example, when a Listener requests to listen to a DJ, the DJ may have the option to accept the requesting Listener (responding YES to indicate the requesting Listener may listen to the DJ) or decline the Listener (responding NO to indicate the requesting Listener may not listen to the DJ). If the DJ responds NO, then the DJ client device may then be returned to operation 408 to have the DJ re-receive a notification of DJ status to then re-distribute DJ availability to Listeners based on if a DJ distribution criteria is met under operation 410. When re-distributing DJ availability to Listeners, the DJ may not be shown as available for the Listener in which the DJ just responded NO. Alternatively, if the DJ responds YES, then method 400 proceeds to operation 414, for example, where notification of a Listener listening may be performed using the multi-media application and software instructions of the computing device operating in a DJ mode.

Figure 5:
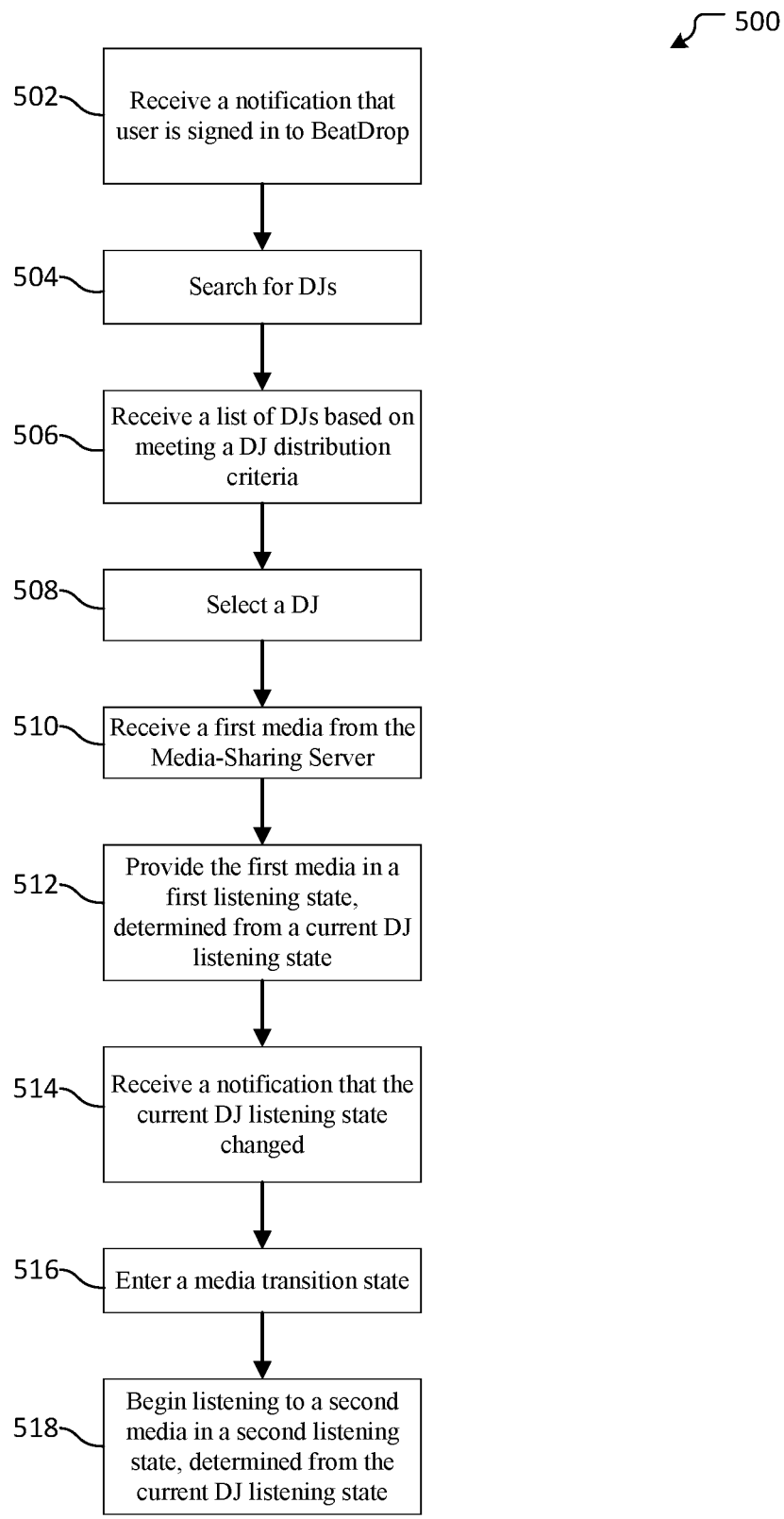
FIG. 5 shows an overview of an example method for listening to broadcasted media contemporaneously, from the client perspective.

FIG. 5 shows an overview of an example method 500 for listening to broadcasted media contemporaneously, from the client perspective. In an example, method 500 may be performed by a computing device, such as computing device 102, 126. In some examples, aspects of method 500 may be performed at operation 202, as discussed above with respect to FIG. 2. Method 500 begins at operation 502, where the computing device receives a notification that a user of the computing device is signed in or logged in to an account on a media-sharing server. As an example, the user may use a computing device to connect to the media-sharing server over a network, such as network 104, and connect to the media-sharing server via an API on the server, such as API 124, and a multi-media application on the computing device, such as multi-media application 108, 130.

Continuing to operation 504, the user performs a search for available DJs. As an example, the search for DJs is initiated by the computing device to engage the media-sharing server to probe for available DJs connected to the media-sharing server over the network. After the search at operation 504 is initiated, operation 506 receives, at the computing device, a list of available DJs based on meeting a DJ distribution criteria. For example, evaluation of the criteria may be performed by the media-sharing server, the computing device, or a combination thereof. As an example, a DJ distribution criteria may be met in a variety of ways. An example of one way the criteria may be met is if the first computing device and second computing device have access permissions to view an authorized group. For example, if the first and second devices are "friends" or are members of the same exclusive group, such as being part of any university, for example to share media or content across the same university campus or across the nation via sharing across different university campuses. As an example, members of university groups may be verified with a .edu domain for an email address of a computing device. As another example, a DJ distribution criteria may be met if the first and second computing devices are within a predefined radius or proximity of each other. This example may be further limited by requiring the DJ to allow broadcasting within the predefined radius, with a further option of broadcasting anonymously. As a further example, the criteria may be met automatically if the DJ has exceeded a moving popularity threshold. For example, the top predefined number of DJs broadcasting on the media-sharing server or DJs identified as celebrity accounts on the media-sharing server may automatically meet this criteria.

At operation 508, the user of the computing device may select a DJ from the available, displayed DJs. As an example, this request may be made by the second computing device (Listener) selecting the DJ through the API of the media-sharing server. The DJ selection available to the second computing device may be divided into categories. As an example, DJ categories may be divided by how the DJ distribution criteria was met, by genre, by popularity, or any other way of categorizing available DJs. As an example, when a Listener requests to listen to a DJ, the DJ may have the option to accept the requesting Listener (responding YES to indicate the requesting Listener may listen to the DJ) or decline the Listener (responding NO to indicate the requesting Listener may not listen to the DJ). If the DJ responds NO, then the Listener may then be returned to operation 506 to receive a new list of available DJs, where the new list may not include the DJ that just responded NO.

If the DJ responds YES, then method 500 continues to operation 512 where a first media or content is provided in a first listening state to the computing device, determined from the current listening state of the DJ. As an example, the media-sharing server may connect to a DJ through a multi-media application of the DJ's computing device to execute software instructions of the DJ's computing device to access a data store for retrieval of stored media or content information, or playback information, being identified by a playback detection engine on the DJ's computing device. Software instructions of the DJ's computing device may then execute to deliver the media or content information to the media-sharing server over a network, to be temporarily stored in a data store of the media-sharing server for later distribution to a Listener's computing device. As a further example, media or content information temporarily stored in the data store of the media-sharing server may be sent to the Listener's computing device over a network, causing a multi-media application of the Listener's computing device to execute software instructions to store the media or content information in a data store to be used to search for associated media or content on a media server or to be played from the media-sharing server on the Listener's computing device, as detected by a playback detection engine.

At operation 514, the Listener's computing device may receive a notification that the current DJ listening state changed. As an example, the current DJ listening state may change if the DJ completes or terminates a first media or content, skips to a second media or content, pauses the first media or content, or other indication from the DJ's computing device that there is a change in state of the first media or content. As a further example, the notification may be presented to the Listener in a variety of ways, and may be accompanied by an option to change the current listening state of the Listener to coincide with the change in state of the DJ.

After receiving a notification that the current DJ listening state changed, method 500 progresses to operation 516 where the Listener's computing device enters a media or content transition state. As an example, the content transition state may be triggered automatically or manually by the Listener, and may correspond with the Listener finishing or completing listening to the first media or content, "liking" the first media or content, skipping or terminating the first media or content, selecting a user interface (UI) element to repeat the first media or content on the media-sharing server or media server, or any other action by the Listener indicating a change in listening state of the first media or content. By way of example, entering the media transition state may result in the media-sharing server becoming a broker for the media or content, as previously described herein with respect to FIG. 3. Additionally or alternatively, UI elements may appear on the Listener's computing device providing purchase information, information about the media or content, information regarding the next available media or content as determined from the current listening state of the DJ, or any other informational display to ease the Listener's transition from one media or content to another.

Method 500 then continues to operation 518, where the Listener begins listening to a second media or content in a second listening state, determined from the current DJ listening state. As an example, operation 518 may be performed in the same or similar manner as operation 512 with a second media or content that may be the same or different from the first media or content listened to previously. It should be appreciated that method 500 may continue to enter media transition states as the DJ listening state continues to change over time. This may be represented by looping back to operation 514 after completing operation 518.

Figure 6:
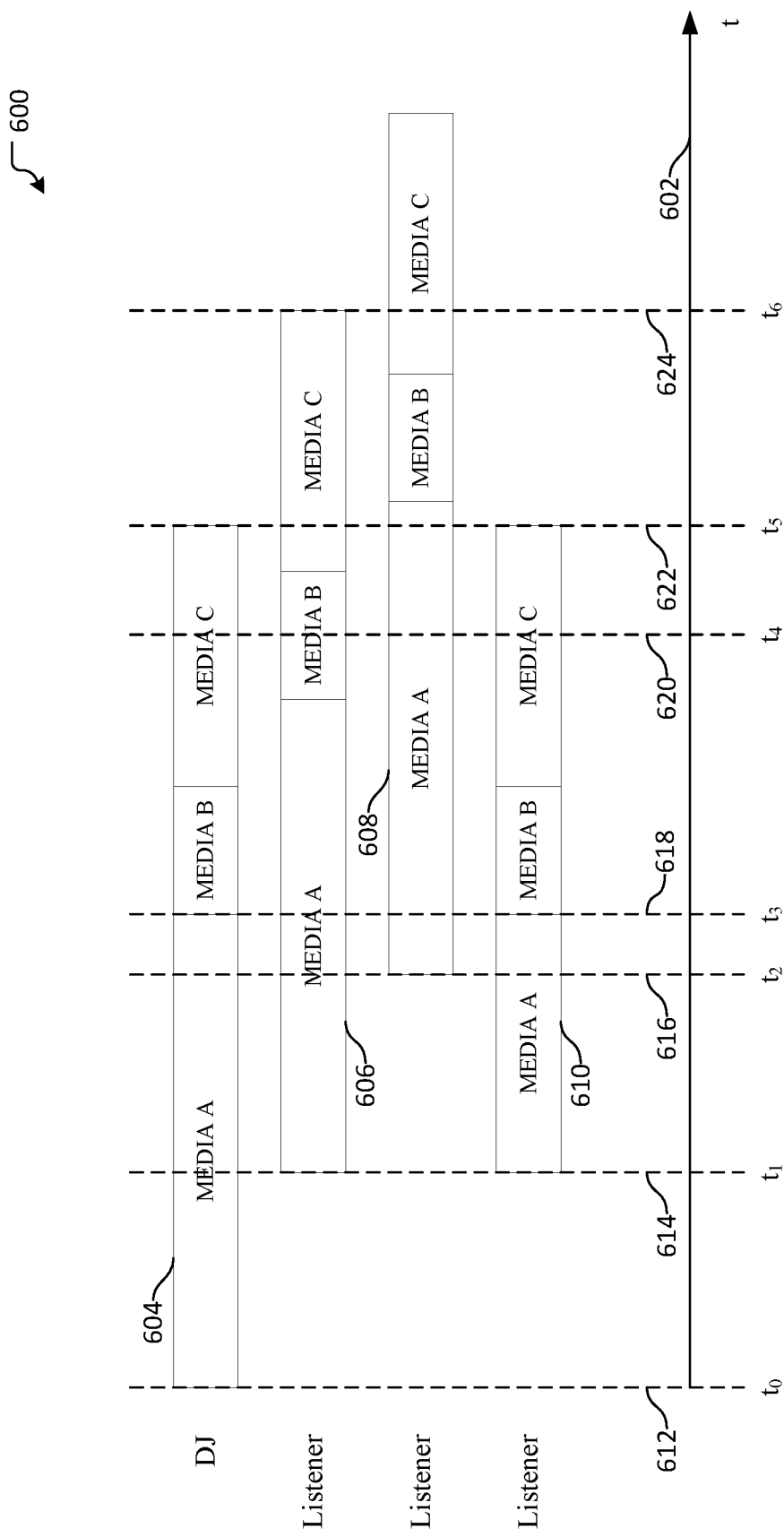
FIG. 6 shows an overview of an example timetable of contemporaneous media sharing and distribution.

FIG. 6 shows an overview of an example timetable 600 of contemporaneous media sharing and distribution. As described herein, contemporaneous may mean a variety of things, including but not limited to simultaneous listening, real-time listening, delayed listening, or any other sharing that may allow at least two devices to listen to media or content from the beginning of each media or content and in the same order. As shown, timetable 600 comprises a DJ media string 604, Listener media strings 606, 608, and 610, and timeline 602. As shown, timestamps 612, 614, 616, 618, 620, 622, 624 along timeline 602 are depicted by dashed vertical lines. Each of media strings 604, 606, 608, 610 comprise three, ordered media or content play times comprising Media A, Media B, and Media C of various lengths as indicated by their relative positioning along timeline 602. As an example, media strings 604, 606, 608, 610 may each be performed by a computing device, such as computing device 102, 126. Listener media strings 606, 608, 610 may be prompted by Listeners connecting to a media-sharing server, such as media-sharing server 120, and carrying out methods described herein with respect to FIGS. 2-5 to share and distribute media or content.

As an example, DJ media string 604 shows which media or content data the DJ listened to with respect to timeline 602. For example, at $t_0$ 612, the DJ began listening to Media A. At $t_3$ 618, the DJ's current listening state changed as the DJ terminated Media A and began listening to Media B. After $t_3$ 618, but before $t_4$ 620, the DJ's current listening state changed again as the DJ terminated Media B and began listening to Media C. At $t_5$ 622, the DJ terminated listening to media or content, which may be exemplified by terminating DJ status or continuing DJ status without playing any media or content.

As a further example, Listener media string 606 began listening to the DJ at $t_1$ 614. As shown, Listener media string 606 begins at the beginning of Media A, the same media or content currently being played by DJ media string 604. In this example, Listener media string 606 is not listening to the same moment of Media A as currently being listened to by the DJ. Listener media string 606 continues to play media in the same order as DJ media string 604, at the same pace as the DJ, thus keeping the same time delay behind each media being listened to by the DJ until termination at $t_6$ 624. Listener media string 606 terminates at $t_6$ 624 because the DJ has no media or content to share beyond that of Media C.

In still a further example, Listener media string 608 progresses in the same way as Listener media string 606, but instead begins media string 608 at a later time, $t_2$ 616. Thus, Listener media strings 606, 608 are listening to the DJ's shared media or content at a constant length of time $t_1$ 614 and $t_2$ 616, respectively, behind the DJ's current listening position.

As another example, Listener media string 610 begins listening to the DJ at the same time, $t_1$ 614, as Listener media string 606. Instead of listening to the DJ at a constant time period behind for all media or content in DJ media string 604, Listener media string 610 progresses to Media B at $t_3$ 618, when DJ media string 604 changes the current listening state. In this example, Listener media string 610 listens to Media A at a constant time behind the DJ, but then selects an option to skip to Media B at the same time as DJ media string 604, thus showing DJ media string 604 and Listener media string 610 simultaneously listening to media or content at any point after $t_3$ 618, and terminating after completing Media C at $t_5$ 622.

In shown timetable 600, a time along timeline 602 may be possible where a Listener may be two media or content files behind the current listening position of the DJ, such as at $t_4$ 620. At $t_4$ 620, DJ media string 604 is currently listening to Media C, but Listener media string 608 is still listening to Media A. In this example at $t_4$ 620, the Listener of Listener media string 608 may have the option to skip two media or content files forward, to listen to Media C, the current media file of the DJ.

Not explicitly shown in this example, the media-sharing server may store all of media or content information, or playback information, for Media A, Media B, and Media C, or a subset thereof. As previously described herein, the media-sharing server may only temporarily store media or content files to share or distribute among computing devices connected to the media-sharing server, or may temporarily store media or content information to identify media or content associated with the media or content information on a media server. The media-sharing server may store media or content information as long as the information is being used by the DJ or any Listener. Alternatively, the media-sharing server may only store media or content information associated with the DJ's current listening state. As applied to example timetable 600 in either of the previously mentioned storage methods, the media-sharing server may only store information associated with Media A between $t_0$ 612 and $t_3$ 618, before DJ media string 604 begins listening to Media B. As another example, at $t_4$ 620, the media-sharing server may store only information associated with Media C, the media of the current listening position of the DJ, or the media-sharing server may store information associated with Media A, Media B, and Media C, each of which are being used by Listener media string 608, Listen media string 606, and DJ media string 604, respectively.

Figure 7A:
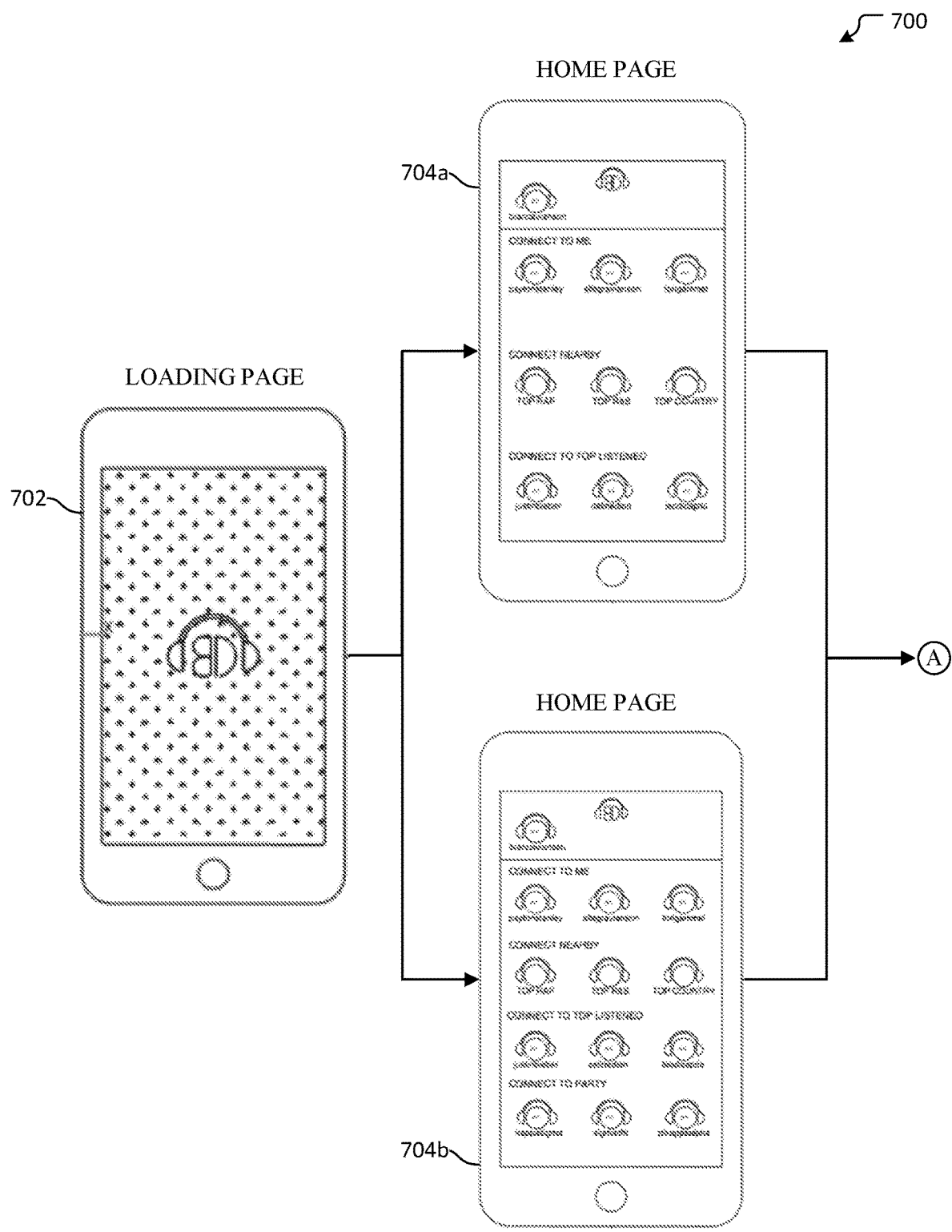
FIG. 7A shows an example user interface loading page and home pages for contemporaneous media sharing and distribution.

FIG. 7A shows an example UI 700 loading page 702 and home pages 704a, 704b for contemporaneous media sharing and distribution. As an example, when a user opens the application, a loading page 702 appears with a logo in the center of the screen (e.g., "BeatDrop"), with a variety of color combinations and animations to indicate how much time is remaining to complete loading of the application. After the application has loaded, the UI 700 transitions to a either a home page 704a without a .edu account, or a home page 704b with a .edu account. Both varieties of home page 704a, 704b include a username, user image, and settings tab, with a variety of categories to display available DJs. These categories may include connect to friends (depending on user authorization and access permissions), connect to nearby (proximity), or connect to top followed (celebrity or popular DJ). If home page 704b is displayed, an additional category titled connect to party may display with DJs available through other users with any .edu domain. Additional UI pages accessed from either home page 704a or 704b are indicated by a Circled A adjacent to a flow arrow among UI 700.

Figure 7B:
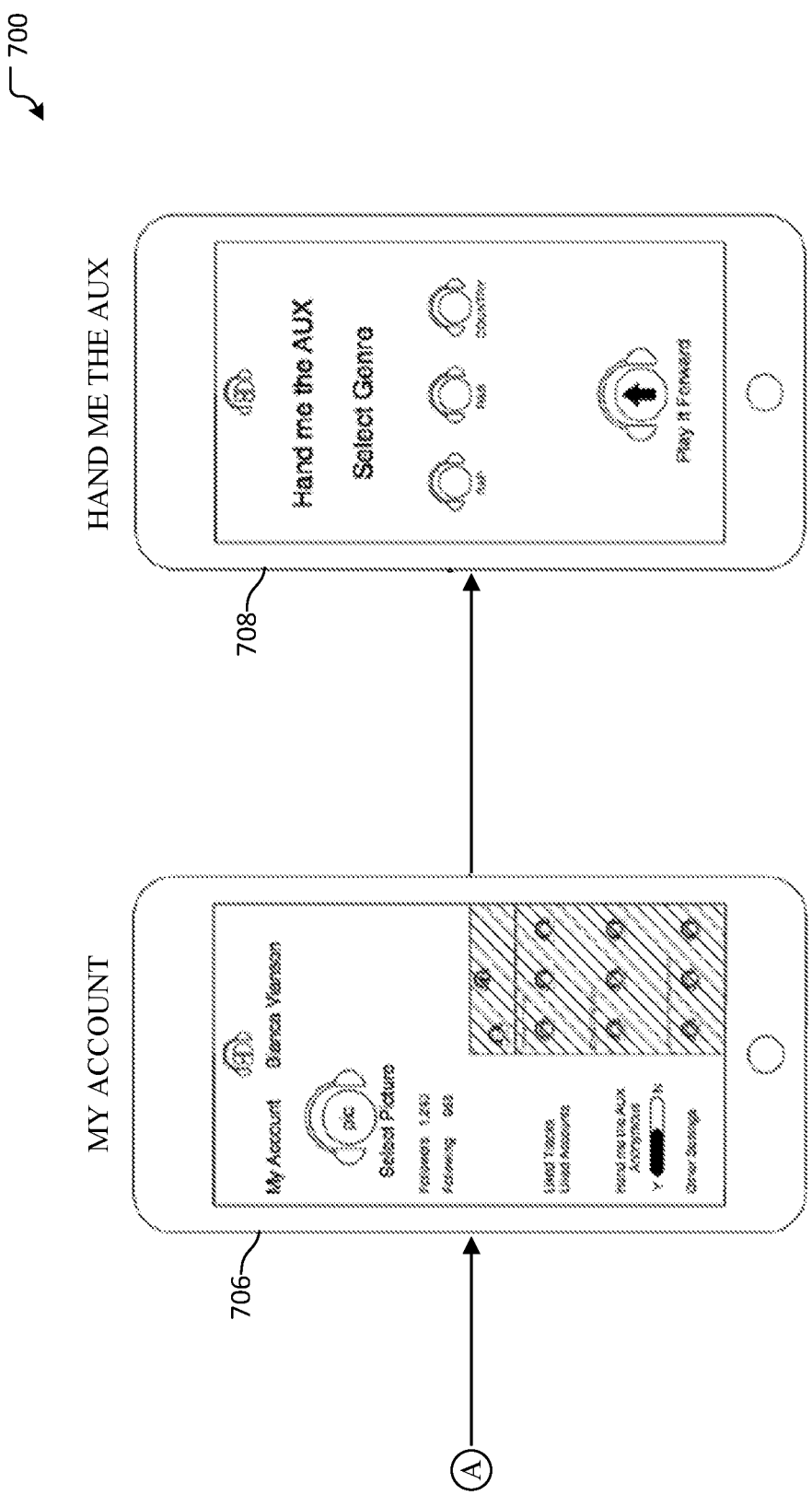
FIG. 7B shows an example user interface account page and hand me the AUX page for contemporaneous media sharing and distribution.

FIG. 7B shows an example UI 700 account page 706 and hand me the AUX page 708 for contemporaneous media sharing and distribution. My account page 706 is accessed from home page 704a, 704b, as indicated by the Circled A. My account page 706 may include a profile picture, list of followers following the user, list of DJs followed, list of liked tracks, list of followed accounts, hand me the AUX element (with an option for an anonymous switch) to become a DJ, in addition to other settings. A profile picture may be any image selected by the user, and is selected when first making an account. When selecting hand me the AUX, hand me the AUX page 708 may appear, enabling the user to select a genre of music of which the user will be broadcasting as a DJ. Additionally, the user has the ability to "play it forward," by having a UI element that enables a user to send a contact link for their current media string to a different user. If a user selects the play if forward link, the user may choose to send a message and select a contact. If the contact does not have a user account, the contact may be prompted to create an account.

Figure 7C:
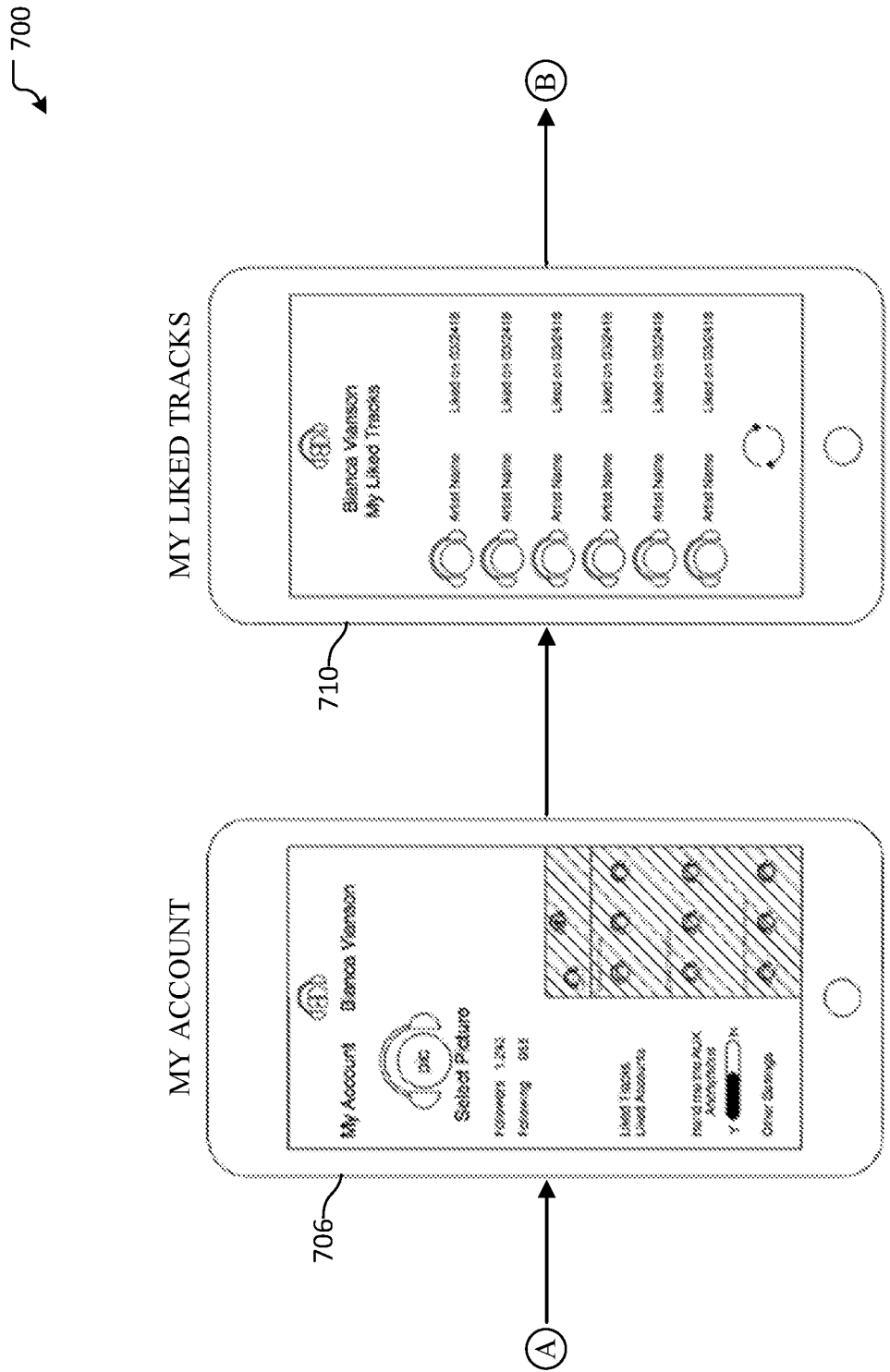
FIG. 7C shows an example user interface account page and liked tracks page for contemporaneous media sharing and distribution.

FIG. 7C shows an example UI 700 account page 706 and liked tracks page 712 for contemporaneous media sharing and distribution. As an alternative example, if a user selects the my liked tracks UI element from account page 706, my liked tracks page 710 may be displayed. My liked tracks page 710 may comprise the name of the media or content liked, album cover or associated imagery, maker or artist, and a timeline of when each of the liked media or content was liked. Media or content may appear in my liked tracks page 710 if the user "hearts" a media or content while listening. If a track is selected from the list of liked tracks, the example UI 700 may progress to another UI display, as shown by the Circled B adjacent to a flow arrow.

Figure 7D:
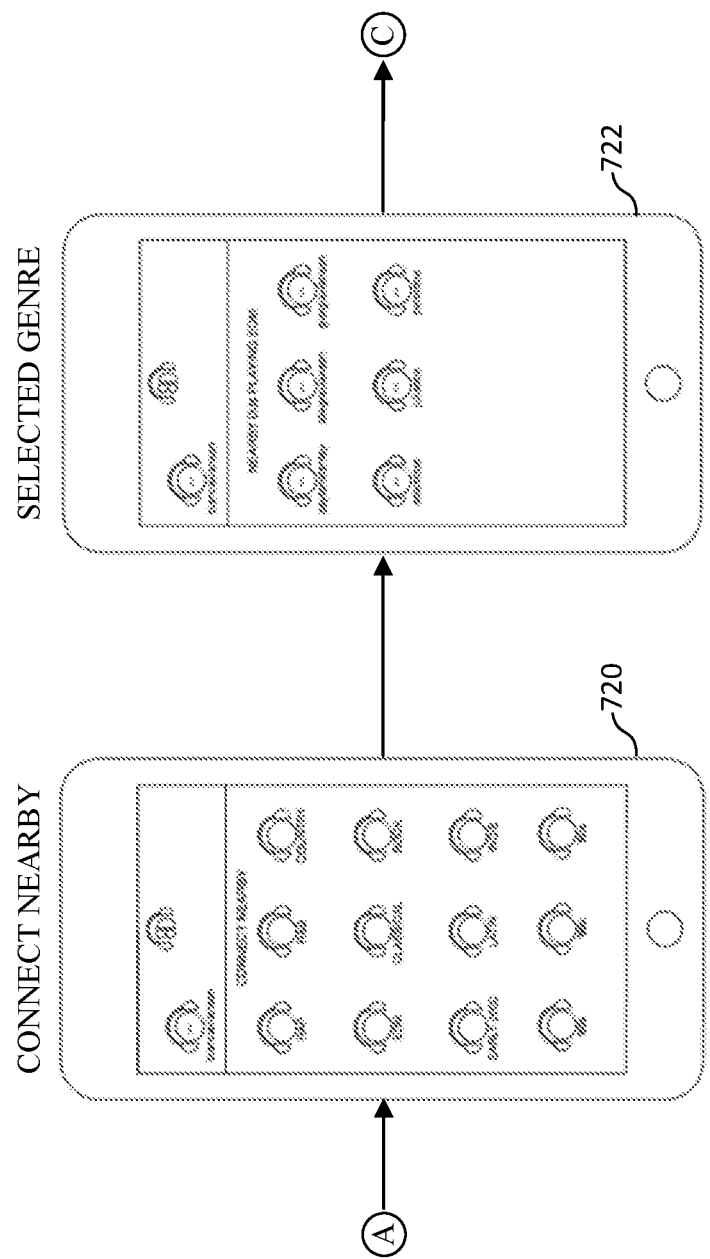
FIG. 7D shows an example user interface connect nearby page and selected genre page for contemporaneous media sharing and distribution.

FIG. 7D shows an example UI 700 connect nearby page 720 and selected genre page 722 for contemporaneous media sharing and distribution. The connect nearby page 720 may be displayed after home pages 704a, 704b, as indicated by Circled A, whereby a GPS of a connected device may sent information about proximity to a computing device operating in a DJ mode. When opening connect nearby page 720, a list of available genres may appear. After a user selects an available genre on connect nearby page 720, selected genre page 722 may appear with available DJs broadcasting the selected genre, with additional information about each DJ, such as popularity, username, and the currently played media or content, which may alternatively be displayed if a DJ is selected. Example UI 700 then flows as indicated by Circled C, listed adjacent to a flow arrow.

Figure 7E:
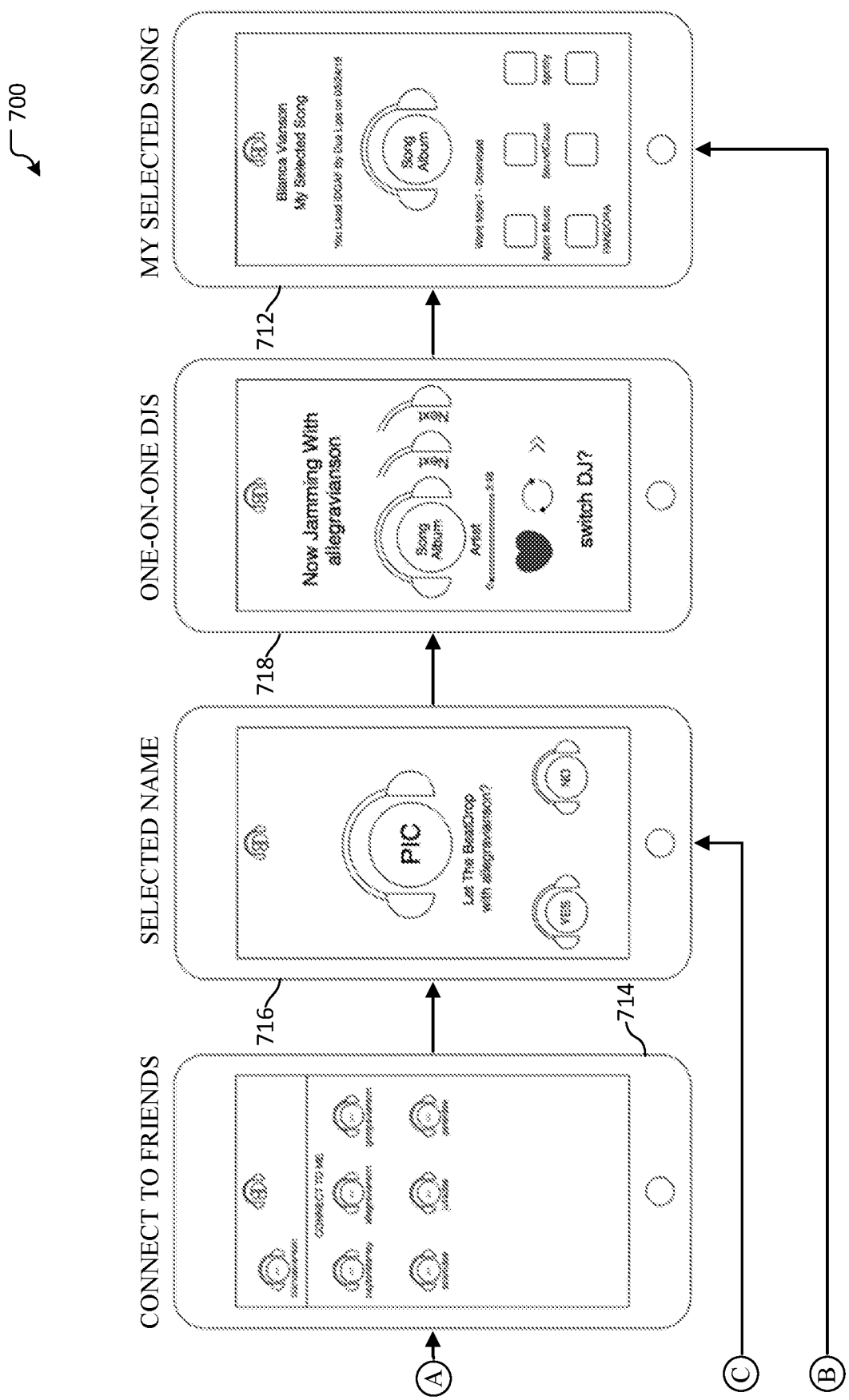
FIG. 7E shows an example user interface connect to friends page, selected name page, one-on-one DJs page, and selected song page for contemporaneous media sharing and distribution.

FIG. 7E shows an example UI 700 connect to friends page 714, selected name page 716, one-on-one DJs page 718, and selected song page 712 for contemporaneous media sharing and distribution. As another example, display may progress from home page 704a, 704b as indicated by Circled A to connect to friends page 714. Connect to friends (or connect to party) page 714 lists available DJs that have authorized access permissions to select an individual as a DJ. For example, an available DJ may be a friend of the user Listener, may be a part of the same .edu domain, or part of the same exclusive group that may be free or require payment. After selecting an available DJ, selected name page 716 may be displayed. Selected name page 716 may appear differently to a DJ or a Listener. For a Listener, additional information about the available DJ may be displayed, in addition to a query to confirm that the Listener wishes to listen to the selected DJ. If a Listener selects NO, the display may return to a prior page, such as connect to friends page 714. If the Listener selects YES, then the DJ may be displayed an alternate selected name page 716 where the DJ may have the option to accept the requesting Listener (responding YES to indicate the requesting Listener may listen to the DJ) or decline the Listener (responding NO to indicate the requesting Listener may not listen to the DJ). If the DJ responds NO, then the Listener may then be returned to a prior page, such as connect to friends page 714 where the DJ responding NO may not be listed, and the DJ may then be returned to a prior page, such as connect to friends page 714.

If the DJ and Listener both select YES, display proceeds to one-on-one DJs page 718 where the Listener is connected to the selected DJ. Information about the current media or content may be displayed, in addition to an option to switch DJs, "like" the media or content, recycle or repeat the media or content (either on the media-sharing server or by redirecting to a third-party source), or skip forward to the next song (if available) in the DJ's media string. If a user selects, likes, recycles, or skips the media or content, the display may proceed to my selected song page 712, where more information about the media or content may be accessed, including purchase information (either through the media-sharing server or to be redirected to a third-party seller).

An additional example not shown in example UI 700 is connect to top followed page. Connect to top followed page displays DJs available to all Listeners due to celebrity status, popularity, or amount of followers. Flow may proceed similarly to connect to friends page 714 through example UI 700.

Figure 8:
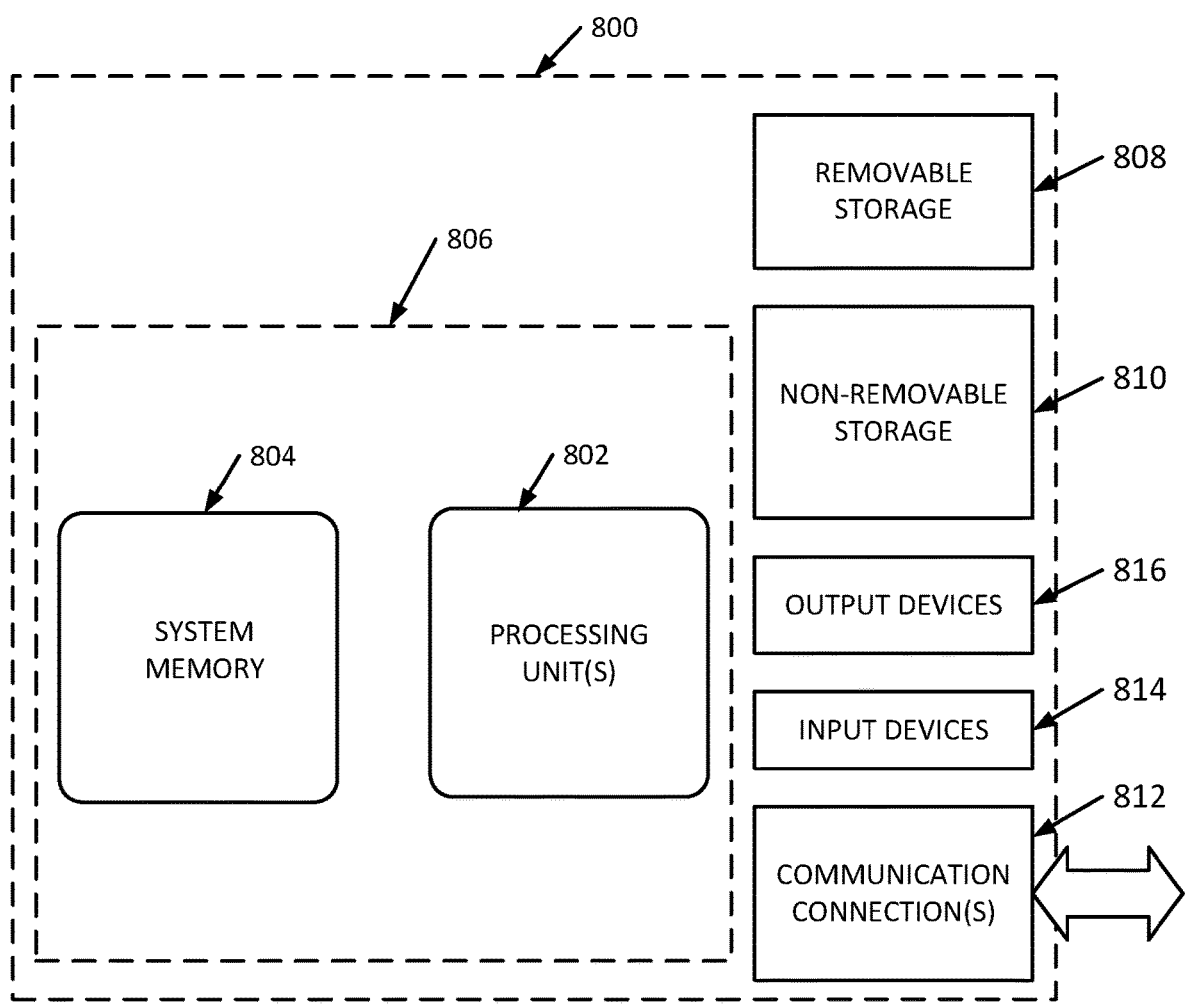
FIG. 8 shows a suitable operating environment in which one or more of the present embodiments may be implemented.

FIG. 8 illustrates one example of a suitable operating environment 800 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 800 typically includes at least one processing unit 802 and memory 804. Depending on the exact configuration and type of computing device, memory 804 may be configured to store, among other things, media, instructions to perform the methods disclosed herein, etc. This most basic configuration is illustrated in FIG. 8 by dashed line 806. Further, environment 800 may also include storage devices (removable, 808, and/or non-removable, 810) including, but not limited to, magnetic or optical disks or tape. Similarly, environment 800 may also have input device(s) 814 such as keyboard, mouse, pen, voice input, etc. and/or output device(s) 816 such as a display, speakers, printer, etc. Also included in the environment may be one or more communication connections, 812, such as LAN, WAN, point to point, etc.

Operating environment 800 typically includes at least some form of computer readable media. Computer readable media can be any available media that can be accessed by processing unit 802 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 800 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

As will be understood from the foregoing disclosure, one aspect of the technology relates to a system for contemporaneous media sharing, the system comprising: at least one processor; and memory storing instructions that, when executed by the at least one processor, causes the system to perform a set of operations, the set of operations comprising: receive an indication that a first computing device is operating in a disc jockey (DJ) mode; determine that a DJ distribution criteria has been met based on at least one of the first computing device and a second computing device; when it is determined that the DJ distribution criteria has been met, notify the second computing device that the first computing device is an available DJ; receive a selection of the available DJ from the second computing device; in response to the selection of the available DJ, retrieve playback information from the first computing device relating to a current listening state; and send the playback information to the second computing device to cause the second computing device to play media associated with the current listening state of the first computing device. In a further example, determining that the DJ distribution criteria has been met comprises an evaluation of at least one of access permission, proximity, or popularity. In yet another example, the set of operations further comprises: receive an indication of a new current listening state of the available DJ; based on the indication, store updated playback information associated with the new current listening state on the media-sharing server. In another example, the set of operations further comprises: receive a notification of a media transition state of the second computing device; retrieve purchase information associated with the media transition state from a media server; and send the purchase information to the second computing device. In another example, the set of operations further comprises: receive a request to perform a purchase transaction; and in response to the request, perform one of: facilitate the purchase transaction on the media-sharing server; or redirect the purchase transaction to a third-party seller. In another example, notifying the second computing device that the first computing device is the available DJ comprises indicating a category associated with the available DJ. In a further example, the category comprising at least one of access permissions, proximity, or popularity. In yet another example, the set of operations further comprises storing the playback information on the media-sharing server. In a further example, the playback information is to be deleted after a specified period of time.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system for contemporaneous media sharing, the system comprising:
    at least one processor; and
    memory storing instructions that, when executed by the at least one processor, causes the system to perform a set of operations, the set of operations comprising:
        receive an indication from a first computing device that the first computing device is operating in a disc jockey (DJ) mode;
        determine that a DJ distribution criteria has been met based on at least one of:
            a device proximity between the first computing device and a second computing device;
            a first access permission to a group of the first computing device and a second access permission to the group of the second computing device; or
            a DJ genre, broadcasted by the first computing device, and a listener genre, selected at the second computing device;
        in response to the DJ distribution criteria being met, notify the second computing device that the first computing device is an available DJ;
        receive an indication, from the second computing device, of a selection of the available DJ;
        in response to the selection of the available DJ, retrieve media information of a current listening state from the first computing device; and
        send the media information of the current listening state to the second computing device to cause the second computing device to search a media server for media associated with the media information of the current listening state of the first computing device.

2. The system of claim 1, wherein determining that the DJ distribution criteria has been met further comprises determining at least one of:
    the device proximity is less than a predefined radius;
    the first access permission and the second access permission indicate membership to the group; or
    the DJ genre is the same as the listener genre.

3. The system of claim 1, wherein the set of operations further comprises:
    receive an indication of a new listening state of the available DJ;
    based on the indication, store new media information of the new listening state on the media-sharing server.

4. The system of claim 1, wherein the set of operations further comprises:
    receive a notification of a media transition state of the second computing device;
    retrieve purchase information associated with the media transition state from a media server; and
    send the purchase information to the second computing device.

5. The system of claim 4, wherein the set of operations further comprises:
    receive a request to perform a purchase transaction; and
    in response to the request, perform one of:
        facilitate the purchase transaction on the media-sharing server; or
        redirect the purchase transaction to a third-party seller.

6. The system of claim 1, wherein notifying the second computing device that the first computing device is the available DJ comprises indicating a category associated with the available DJ.

7. The system of claim 6, the category comprising at least one of access permissions, proximity, genre, or popularity.

8. The system of claim 1, wherein the set of operations further comprises storing the media information on the media-sharing server.

9. The system of claim 8, wherein the media information is to be deleted after a specified period of time.

10. A system for contemporaneous media sharing, the system comprising:
    at least one processor; and
    memory storing instructions that, when executed by the at least one processor, causes the system to perform a set of operations, the set of operations comprising:
        receive a notification that a user of a first computing device is signed in to a media-sharing server;
        determine that the user is listening to media in a current listening state;
        send a request to the media-sharing server to list the user as a disc jockey (DJ);
        receive a notification that the user is operating in a DJ mode;
        send media information to the media-sharing server;
        determine that a DJ distribution criteria has been met based on at least one of:
            a device proximity between the first computing device and a second computing device, the second device associated with a listener user;

a first access permission to a group of the DJ and a second access permission to the group of the listener user; or a DJ genre, associated with the media being listed to by the DJ, and a listener genre, selected at the second computing device; and in response to determining that the DJ distribution criteria has been met, receive a notification that the second computing device is listening to the media being listed to by the DJ.

11. The system of claim 10, wherein determining that the DJ distribution criteria has been met further comprises determining at least one of:

the device proximity is less than a predefined radius;
the first access permission and the second access permission indicate membership to the group; or
the DJ genre is the same as the listener genre.

12. The system of claim 10, wherein the set of operations further comprises:

determine a new listening state of the user; and
send new media information of the new listening state to the media-sharing server.

13. A system for contemporaneous media sharing, the system comprising:

at least one processor; and
memory storing instructions that, when executed by the at least one processor, causes the system to perform a set of operations, the set of operations comprising:
receive a notification that a DJ user of a first computing device and a listener user of a second computing device are signed in to a media-sharing server;
receive an indication that the DJ user of the first computing device is operating in a disc jockey (DJ) mode, wherein operation in the DJ mode is allowed when a DJ distribution criteria has been met, the DJ distribution criteria based on at least one of:
a device proximity between the first computing device and a second computing device;
a first access permission to a group of the DJ user and a second access permission to the group of the listener user; or
a DJ genre associated with the DJ user and a listener genre associated with the listener user;
receive an indication that the listener user selected the DJ user as a selected DJ;
receive first media information of a first DJ listening state from the media-sharing server, the media information associated with the DJ user of the first computing device;
determine a first media associated with the first media information;
provide the first media for listening by the listener user at the second computing device;
receive a notification from the media-sharing server of a second DJ listening state;
enter a media transition state;
receive second media information of the second DJ listening state from the media-sharing server;
determine a second media associated with the second media information; and
provide the second media for listening by the listener user at the second computing device.

14. The system of claim 13, wherein determining that the DJ distribution criteria has been met further comprises determining at least one of:

the device proximity is less than a predefined radius;
the first access permission and the second access permission indicate membership to the group; or
the DJ genre is the same as the listener genre.

15. The system of claim 13, wherein the set of operations further comprises:

receive a notification from the media-sharing server of a third DJ listening state;
enter the media transition state;
receive third media information of the third DJ listening state from the media-sharing server;
determine a third media associated with the third media information; and
provide the third media for listening by the listener user at the second computing device.

16. The system of claim 13, wherein the set of operations further comprises:

receive purchase information associated with the media transition state;
send a request to the media-sharing server or a third-party seller to perform a purchase transaction; and
in response to the request, perform one of:
receive purchase transaction information from the media-sharing server; or
receive purchase transaction information from a third-party seller.

17. The system of claim 13, wherein receive an indication that a second user of a second computing device is operating in a disc jockey (DJ) mode comprises indicating a category associated with the available DJ.

18. The system of claim 17, the category comprising at least one of access permissions, proximity, genre, or popularity.

19. The system of claim 13, wherein determining a first media associated with the first media information comprises searching for the first media on a media server.

20. The system of claim 19, wherein determining a second media associated with the second media information comprises searching for the second media on the media server.

* * * * *